Figure 1:
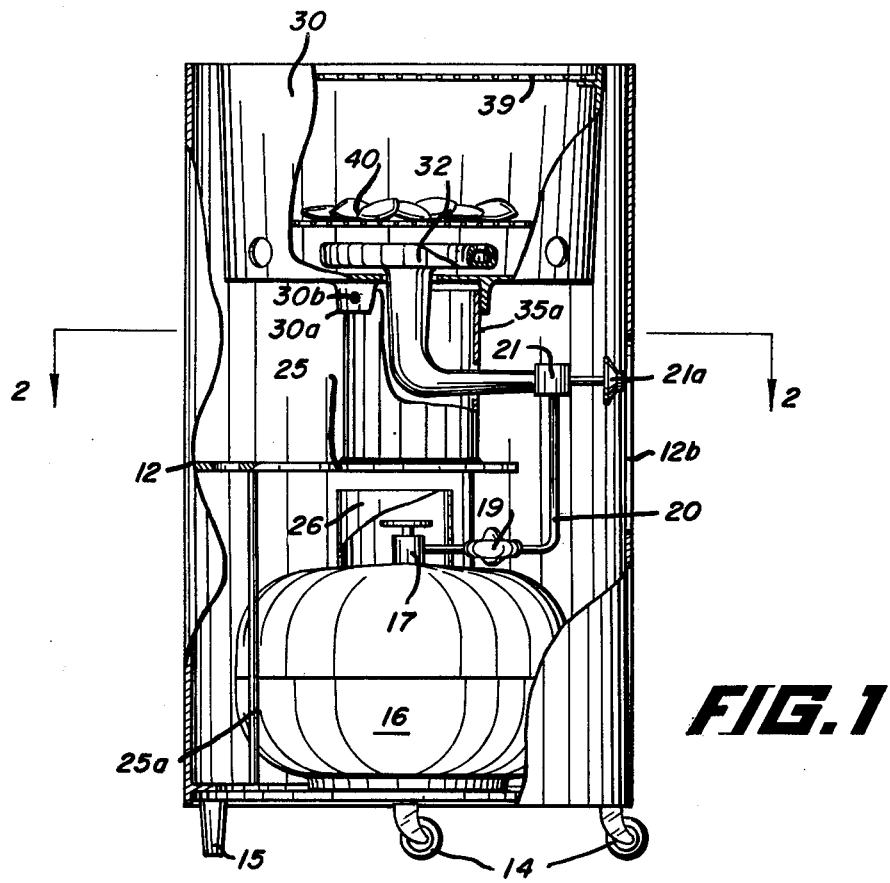

United States Patent [19]
Dailey

[11] 3,964,463
[45] June 22, 1976

[54] OUTDOOR COOKING ARRANGEMENT

[75] Inventor: Donald E. Dailey, Evansville, Ind.

[73] Assignee: Arkla Industries, Inc., Evansville, Ind.

[22] Filed: May 28, 1974

[21] Appl. No.: 473,872

Related U.S. Application Data

[63] Continuation of Ser. No. 253,447, May 15, 1972, abandoned.

[52] U.S. Cl. ............................. 126/41 R; 126/25 R
[51] Int. Cl.² ...................... A47J 37/00; F24C 3/00
[58] Field of Search............. 126/38, 41, 25 R, 9 R, 126/275 R

[56] References Cited
UNITED STATES PATENTS

| 3,095,495 | 6/1963 | Gvozdjak et al. | 126/41 X |
| 3,386,432 | 6/1968 | Hanson | 126/41 |

*Primary Examiner*—Edward G. Favors
*Attorney, Agent, or Firm*—Warren D. Flackbert

[57] ABSTRACT

An outdoor cooking grill designed specifically for use on porches, apartment balconies or confined outdoor living areas, where people, combustible clothing and furnishings are in close and hazardous proximity to the grill. Means are provided to assure optimum safety during the cooking operation.

5 Claims, 2 Drawing Figures

OUTDOOR COOKING ARRANGEMENT

This is a continuation of application Ser. No. 253,447, filed May 15, 1972 now abandoned.

As is known, the temperature requirements for grilling foods outdoors must range over 500° Fahrenheit, a figure high enough to cause severe burns to people and/or to scorch or ignite clothing, wooden furniture, paint, or the like, that may come in contact with the cooking vessel, or, as a matter of fact will also result in the death of living plants exposed to extreme heat. Briefly, the invention, which may assume various configurations, basically involves an outer housing, typically circular in horizontal section, spaced apart from the cooking vessel of the invention by a sufficient distance to provide a blanket of insulating neutral air. In this connection, the outer housing is not supported from, or is not in direct contact with the heated cooking vessel and, thereby, no heat is conducted to such outer housing. Consequently, the outer housing remains at a temperature which is not hazardous to people, adjacent materials, or the like.

Moreover, the invention includes within the same outer housing the aforesaid heated cooking vessel and as well as the fuel supply, the latter being typically liquified petroleum. In some applications of the invention, the grill for the food is supported above or alongside the fuel source, but, in any event, the placement of the fuel source approximate the bottom of the cooking grill serves an added feature, i.e. permits a degree of stability which prevents any accidental overturning of the overall unit. It might be noted at this point that the cooking grill defining the invention is typically mounted on rollers as well as fixed legs, the rollers permitting ease of movement of the grill to any desired cooking site.

A further safety feature of the invention, in addition to the already discussed position of the fuel source within the outer housing, if in contrast, the grill, operating on liquified petroleum gas, is conventionally connected to a spaced apart tank of fuel by means of a flexible hose, the latter is subject to interruption of flow, by the accidental pressure of foot or other weight. In other words, if the preceding occurs, the flow of hazardous gas is momentarily halted and the flame is extinguished and then resumes without burning. The invention provides a fixed and covered connection between the source of fuel and the burner and obviates the aforesaid condition.

Moreover, a still further safety feature of the invention is the recessed location of the control valve for the burner so that the source of fuel cannot be accidentally turned on by bumping or other unintended contact. As stated, the invention provides movability of the combined cooker and fuel source, it being well known that excessive wind can be a hazard in outdoor cooking, especially on the decks of high-rise apartments. Erratic wind can cause flare-ups or flame from burning meat or fowl juices. Hence, the invention permits movement to less turbulent and safer areas or a porch or deck.

An added advantage, too, is the elimination of the hazards of alternative charcoal disposal, the latter being a problem frequently met when the still "live" charcoal is dumped into trash chutes of multi-storied dwellings, oftentimes causing fires in the chutes or basement trash receptacles.

The invention is so arranged that the operating position of the source of fuel, the cooking burner, and the connecting passages and controls cannot be accidentally violated during the process of replacing the tank of fuel, where, as further stated above, the single opening for access to the main shut-off valve through the same opening used for control valve access makes it a simple, convenient and natural operation to close the main shut-off valve while closing the control valve. As a matter of aesthetics, and considering the temperature of the outer housing, it is quite possible for colors and decorative effects to be employed on such outer housing which would be appropriate to the porch and terrace at hand and, yet, formerly impossible with conventional type grill temperatures.

Figure 2:
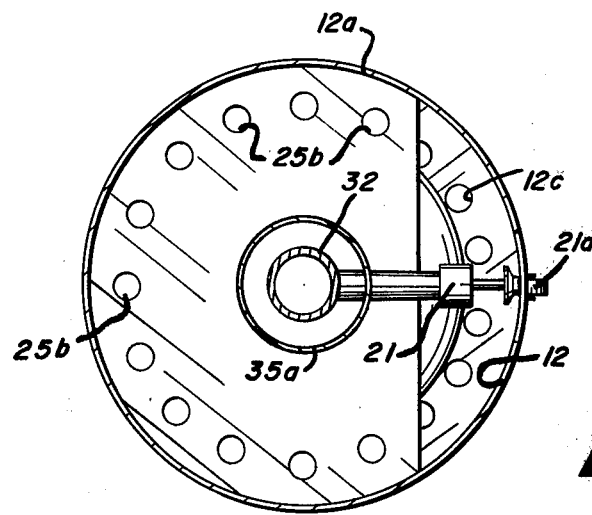

A better understanding of the present invention will become more apparent from the following description taken in conjunction with the accompanying drawings, wherein FIG. 1 is an elevational view, partly broken away and partly in section, showing an outdoor cooking arrangement in accordance with the invention; and, FIG. 2 is a view in vertical section, taken at line 2—2 of FIG. 1 and looking in the direction of the arrows, showing still further details of the invention at hand.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the figures, the invention is characterized by an outer housing 12, typically in the form of a drum. A plate 12a is disposed at the bottom of the outer housing 12, containing a series of openings 12c for air admission. In order to achieve portability, at least two casters 14 may be provided, as well as one or more legs 15. A fuel tank 16, such as a supply of liquid pressurized gas, is typically disposed on the plate 12a on the bottom of the outer housing 12.

It should be evident from the mid-area of the figure, the fuel supply tank 16 is rather conventional insofar as controls are concerned, typically combining with a shut-off valve 17, a regulator 19, and tubing 20 leading to a control valve 21 operated by a control knob 21a. A passageway 12b, vertically disposed, extends through a side wall of the outer housing 12 and provides ready access to the aforesaid shut-off valve 17 as well as to the aforesaid control knob 21a.

As to further structural details, vertically extending legs 25a are disposed within the outer housing 12 and mount a plate member 25 also having openings 25b therein for permitting air passage. It should be noted that a collar 26 partially surrounds the defined shut-off valve 17 associated with regulator 19 of the fuel tank 16.

Looking now at the invention as shown in FIG. 1, a cooking vessel 30 is disposed within the outer housing 12, typically being cast aluminum and having a downwardly depending collar 30a extending therefrom, the latter overlying a collar 35a, where, provision may be made, in the form of screw means 30b, for the positive assembly of such collars 30a and 35a.

Disposed within the cooking vessel 30 is a burner 32, preferably of doughnut configuration. As should be evident from the drawing, the cooking vessel 30 includes means immediately above the burner 32 for receiving rocks 40 commonly used on gas grills to distribute the heat, where the assembly is completed through the use of cooking grid 39. In any event, the important relationship to be remembered is the spacing between the outer housing 12 and the cooking vessel of the invention, serving as a heat barrier so that the outer housing 12 remains at a safe temperature for not only the user but for material proximate the site of use of the invention.

From the preceding, it should be apparent that the invention provides an important approach for an outdoor cooking arrangement in situations which may be limited in size, or otherwise confined, such as on porches, balconies, or the like. In any event, people, combustible clothing worn by people, and furniture which is close at hand have added to the hazardous nature of any type of cooking arrangement presented heretofore. Accordingly, through the use of an outer housing spaced a sufficient distance from the inside workings of the invention to provide a blanket of insulating, neutral air, exceptional results have been achieved. The invention, therefore, satisfies a need which has been in demand as long as the prevalency and increasing interest in outdoor cooking is concerned, representing simplicity in components and providing, as stated in various ways, a high degree of safety for the user as well as for the premises of the user. Obviously, the outdoor cooking arrangement of the invention may be modified, such as proportioning, varying the support arrangement, utilizing other types of burners or the like. Thus, the preceding description should be considered illustrative and not as limiting the scope of the following claims:

I claim:

1. A cooking arrangement characterized by a cooking vessel surrounded by an outer housing including a base member proximate the bottom thereof, said cooking vessel defined by a side and a bottom, a source of fuel disposed above said base member within said outer housing, control means for said source of fuel, a plate member disposed within said outer housing and mounting said cooking vessel, a burner within said cooking vessel communicating through an opening in said bottom of said cooking vessel with said source of fuel, and a cooking grid positioned above said burner within said cooking vessel, said outer housing being spaced apart from said side of said cooking vessel to define a blanket of insulating neutral air.

2. The cooking arrangement of claim 1 where said plate member includes an air inlet opening.

3. The cooking arrangement of claim 1 where means disposed between said burner and said cooking grid receive heat distributing elements.

4. The cooking arrangement of claim 1 where said base member is a plate including an air inlet opening.

5. The cooking arrangement of claim 1 where an opening is provided in the side of said outer housing to provide access to said control means for said source of fuel.

* * * * *